United States Patent
Konik et al.

(10) Patent No.: US 7,689,534 B2
(45) Date of Patent: Mar. 30, 2010

(54) AFFECTING DATABASE FILE PERFORMANCE BY ALLOWING DELAYED QUERY LANGUAGE TRIGGER FIRING

(75) Inventors: Rafal Przemyslaw Konik, Oronoco, MN (US); Mark William Theuer, Rochester, MN (US); Michael Alan Venz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 11/776,029

(22) Filed: Jul. 11, 2007

(65) Prior Publication Data

US 2009/0019198 A1   Jan. 15, 2009

(51) Int. Cl.
*G06F 7/00* (2006.01)
*G06F 3/00* (2006.01)

(52) U.S. Cl. .............. 707/1; 707/3; 707/9; 710/16; 710/17; 710/18

(58) Field of Classification Search ............ None
See application file for complete search history.

(56) References Cited

U.S. PATENT DOCUMENTS 6,910,070 B1 * 6/2005 Mishra et al. ............ 709/224
7,194,451 B2 * 3/2007 Chaudhuri et al. ........... 707/2

* cited by examiner

*Primary Examiner*—Alan Chen
(74) *Attorney, Agent, or Firm*—Patterson & Sheridan, LLP

(57) ABSTRACT

Embodiments of the invention provide techniques for processing database triggers having delay attributes. In general, delay attributes may selectively introduce a delay between the firing of a trigger and the execution of the triggered action. The delay may be based on waiting for a specified time interval, waiting until a specified time, or reaching a predetermined threshold of a measure of system performance. The use of delay attributes may enable greater control over the timing of the execution of the triggered action, resulting in reduced impact on the performance of an underlying system.

21 Claims, 4 Drawing Sheets

AFFECTING DATABASE FILE PERFORMANCE BY ALLOWING DELAYED QUERY LANGUAGE TRIGGER FIRING

BACKGROUND OF THE INVENTION

1. Field of the Invention

The invention generally relates to computer database systems. More particularly, the invention relates to techniques for delayed firing of database triggers.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

In some cases, a table is manipulated by the use of triggers. Triggers are procedures that are defined by users of the DBMS. The DBMS invokes triggers when particular events (associated with the triggers) occur. Specifically, an SQL trigger program is typically written to take some action due to an event, such as an insert, update, or delete operation against an SQL table in a database. For example, in the case of an insert operation, a trigger can be defined such that it is invoked each time a row is inserted into a particular SQL table. A trigger can instruct the system to take any number of actions when a specified change is attempted.

Conventionally, one problem with the use of triggers is that they can result in large demands for database processing, which can impact the overall performance of a system which includes the database. For example, a trigger may be configured to send an email to each person included in a new database record. In the event that a large number of records are being added to the database, the delay caused by sending each person an email can result in a long delay in completing the creation of the new records.

Therefore, there is a need for improved techniques for processing database triggers.

SUMMARY OF THE INVENTION

Embodiments of the invention generally provide techniques for processing database triggers.

One embodiment of the invention provides a computer-implemented method for controlling the firing of database triggers, comprising: receiving an I/O event affecting a database trigger; identifying one or more delay conditions defined for the database trigger; and delaying the firing of the database trigger until the one or more identified delay conditions are satisfied.

Another embodiment of the invention provides a computer-readable storage medium containing a program which, when executed, performs an operation. The operation comprises: receiving an I/O event affecting a database trigger; identifying one or more delay conditions defined for the database trigger; and delaying the firing of the database trigger until the one or more identified delay conditions are satisfied.

Yet another embodiment of the invention provides a system, comprising: a processor; and a memory containing a program configured to compose a query of hierarchical data by performing an operation. The operation comprises: receiving an I/O event affecting a database trigger; identifying one or more delay conditions defined for the database trigger; and delaying the firing of the database trigger until the one or more identified delay conditions are satisfied.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
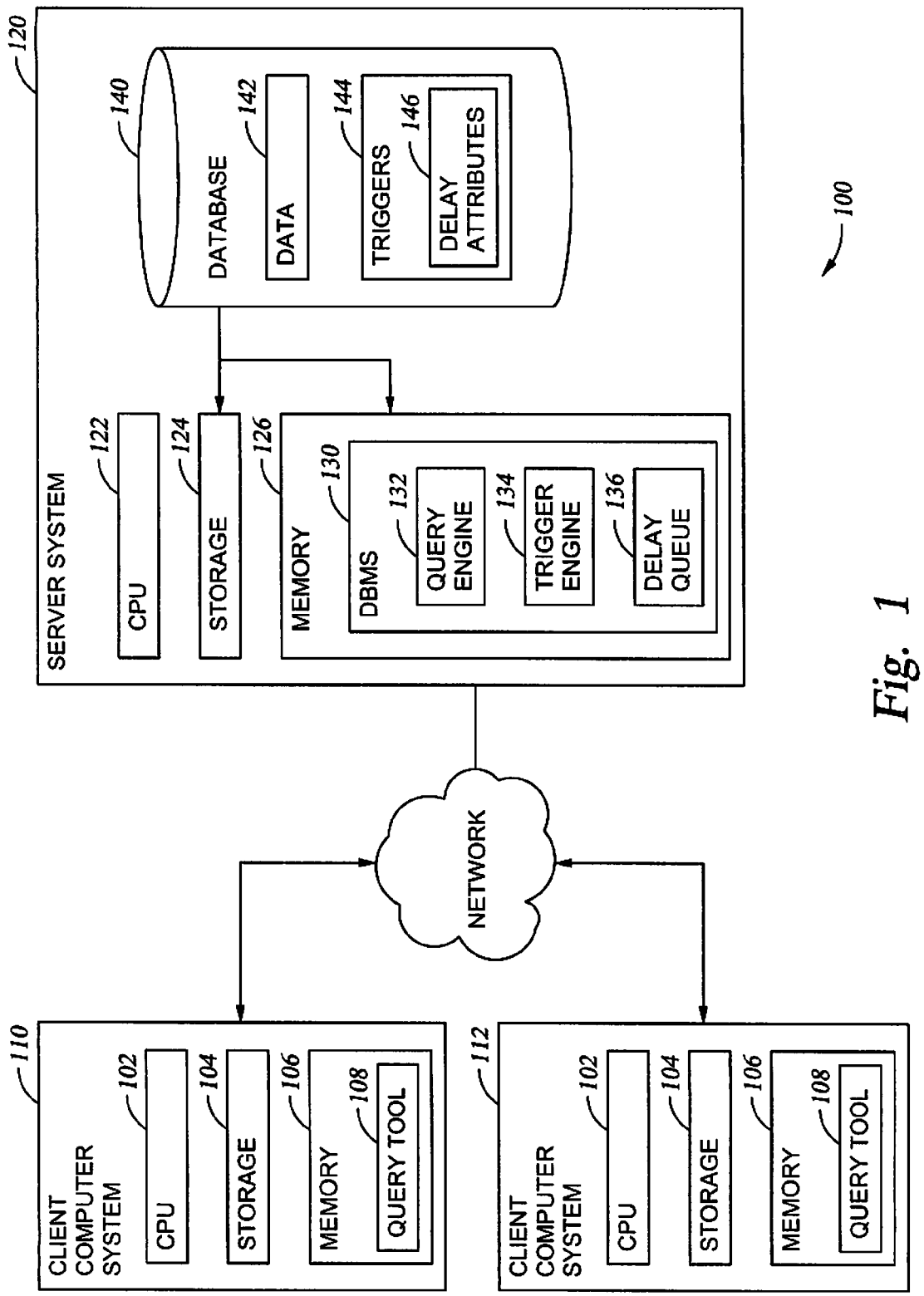
FIG. 1 is a block diagram that illustrates a client server view of a computing environment, according to one embodiment of the invention.

Embodiments of the invention provide techniques for processing database triggers having delay attributes. In general, delay attributes may selectively introduce a delay between the firing of a trigger and the execution of the triggered action. The delay may be based on waiting for a specified time interval, waiting until a specified time, or reaching a predetermined threshold of a measure of system performance. The use of delay attributes may enable greater control over the timing of the execution of the triggered action, resulting in reduced impact on the performance of an underlying system. That is, by delaying the processing of triggers until a point when there is less demand on a system, there may be increased system efficiency.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes two client computer systems 110 and 112, network 115 and server system 120. In one embodiment, the computer systems illustrated in environment 100 may include existing computer systems, e.g., desktop computers, server computers laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, client computer systems 110 and 112 each include a CPU 102, storage 114 and memory 106, typically connected by a bus (not shown). CPU 102 is a programmable logic device that performs all the instruction, logic, and mathematical processing in a computer. Storage 104 stores application programs and data for use by client computer systems 110 and 112. Storage 104 includes hard-disk drives, flash memory devices, optical media and the like. The network 115 generally represents any kind of data communications network. Accordingly, the network 115 may represent both local and wide area networks, including the Internet.

The client computer systems 110 and 112 are also shown to include a query tool 108. In one embodiment, the query tool 108 is software application that allows end users to access information stored in a database (e.g., database 140). Accordingly, the query tool 108 may allow users to compose and submit a query to a database system, which, in response, may be configured to process the query and return a set of query results. The query tool 108 may be configured to compose queries in a database query language, such as Structured Query Language (SQL). However, it should be noted that the query tool 108 is only shown by way of example; any suitable requesting entity may submit a query (e.g., another application, an operating system, etc.).

In one embodiment, the server 120 includes a CPU 122, storage 124, memory 126, a database 140, and a database management system (DBMS) 130. As shown, the database 140 may include data 142 and triggers 144. The data 142 represents the substantive data stored by the database 140. At various times, elements of the database 140 may be present in storage 124 and memory 126.

In one embodiment, the triggers 144 may be defined by users of the database 140. In one embodiment, triggers 144 may be created and maintained by users interacting with a graphical user interface (GUI) configured for this purpose. It is contemplated that the triggers 144 may also be created and maintained by any other suitable technique, for example the "CREATE TRIGGER" command available in the SQL database command language.

Each trigger 144 may include a firing condition and a triggered action. Typically, a firing condition specifies an input/output (I/O) event occurring in the database 140 which will cause the trigger 144 to be "fired" (i.e., activated). Such I/O events include an INSERT event (a new record is inserted into the database), an UPDATE event (an existing record is changed), or a DELETE event (an existing record is deleted). Generally, the firing of a trigger 144 causes the triggered action to be executed. For example, a trigger 144 may be configured to fire on an INSERT event of records of a customer database table, and to then perform the triggered action of sending individual emails to customers included in the inserted records.

In one embodiment, the triggers 144 include delay attributes 146, which serve to delay the execution of the triggered action after the firing of a trigger 144. One potential use of delay attributes 146 may be to postpone the processing of a trigger 144 so as to minimize any impact on the performance of an underlying system (e.g., server 120). That is, by delaying the processing of triggers until a point when there is less demand on a system, there may be increased system efficiency.

The delay attributes 146 may be specified at the time of creating a trigger 144, or may be added and/or modified at a later time. In one embodiment, the delay attributes 146 specify a time interval that must elapse between the firing of the trigger 144 and the resulting triggered action. For example, an exemplary trigger may include a delay attribute specifying a time interval of two hours. Thus, in the event the exemplary trigger is fired, the triggered action will not occur until two hours later.

In another embodiment, the delay attributes 146 may specify a start time and/or date for performing the triggered action. For example, a second exemplary trigger may include a delay attribute specifying a start time of 1 A.M. Thus, in the event the second exemplary trigger is fired, the triggered action will not occur until the next instance of a time of 1 A.M.

In yet another embodiment, the delay attributes 146 may specify that a triggered action will not be executed in a system that is performing at reduced performance due to, for example, a large system workload. More specifically, an exemplary trigger may be configured so that, in the event it is fired, the resulting triggered action may not be executed as long as a given measure of the performance of the database 140 and/or the server system 120 is below a predetermined threshold. The performance of the database 140 may be measured, for example, by database throughput, response time, cost per transaction, and the like. The performance of the server system 120 may be measured, for example, by CPU utilization, memory utilization, page faults, and the like. Of course, these measures of database and system performance are provided for illustrative purposes only. It is contemplated that any suitable performance measures may be used instead of, or in combination with, the above examples. It is also contemplated that the above embodiments may be used in combination, such as a combination of delay attributes related to time and performance measure. For example, a trigger may have delay attributes that cause a time delay of two hours, and then delay execution until a performance measure falls below a predefined threshold.

The DBMS 130 provides a software application used to organize, analyze, and modify information stored in the database 140. As shown, the DBMS 130 includes a query engine 132, a trigger engine 134 and a delay queue 136. The query engine 132 may be configured to process database queries submitted by a requesting application (e.g., a query generated using query tool 108) and to return a set of query results to the requesting application. In one embodiment, the trigger engine 134 may be configured to monitor the triggers 144 to determine if a trigger has been activated and, if so, to manage the execution of the triggered action. The execution of a triggered action may be delayed by the trigger engine 134 according to the delay attributes 146 included in the activated trigger 144. More specifically, the trigger engine 134 may be configured to hold the activated trigger 144 in the delay queue 136 until the requirements specified in the delay attributes 146 are satisfied, and thereafter execute the triggered action.

Figure 2:
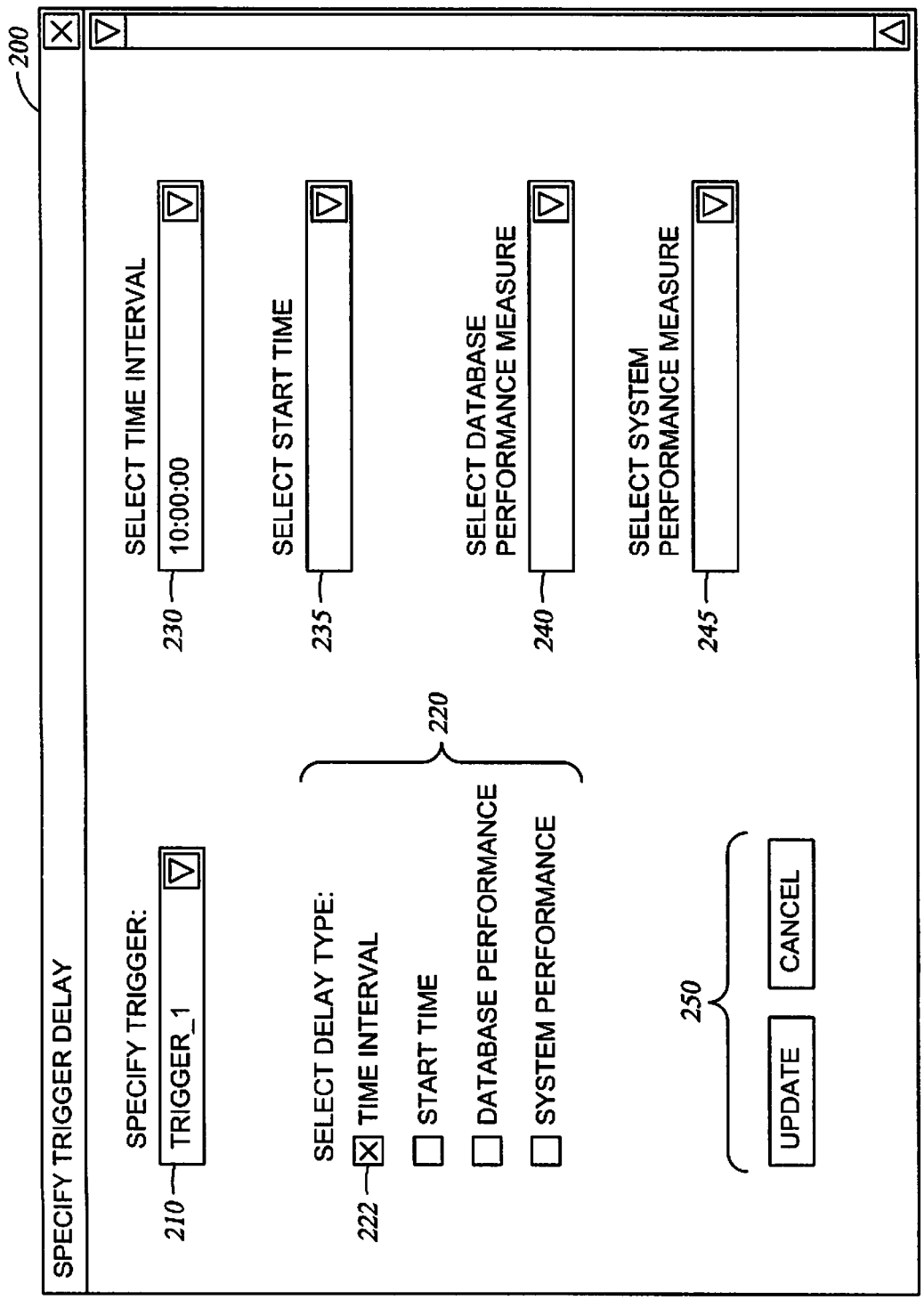
FIG. 2 illustrates a display screen of a graphical user interface (GUI) for specifying delay attributes of a database trigger, according to one embodiment of the invention.

FIG. 2 illustrates a display screen of a graphical user interface (GUI) 200 for specifying delay attributes of a database trigger, according to one embodiment of the invention. The GUI 200 may interface with, for example, the DBMS 130 illustrated in FIG. 1. In one embodiment, the GUI 200 may be viewed by a user of a server (e.g., server 120 shown in FIG. 1).

As shown, the GUI 200 includes a trigger selection 210, delay type selections 220, a time interval selection 230, a start time selection 235, a database performance measure selection 240, a system performance measure selections 245, and control buttons 250. The control buttons 250 may enable the user to perform typical functions in the GUI 200, such as executing commands, cancelling commands, and the like. The trigger selection 210 enables a user to select a particular trigger for which to specify delay attributes. In this example, the trigger selection 210 indicates that the delay attributes belong to a trigger named "TRIGGER_1".

In one embodiment, a user of GUI 200 may select a delay type, and may then specify a corresponding delay condition that must be met to end the delay. As shown, the delay type selections 220 enable a user to specify delays based on a time interval, a start time, a database performance measure, or a system performance measure. In this illustration, the user has selected checkbox 222, thus specifying a delay based on a time interval. Accordingly, the user has also entered a time value in the time interval selection 230. The remaining selections 235, 240, 245 are left blank, since they are not used for a time interval delay. In this example, the user has specified a time interval selection 230 of "10:00:00," meaning that 10 hours must elapse between the activation of the trigger "TRIGGER_1" and the execution of the triggered action. Of course, GUI 200 is provided for illustrative purposes only. It is contemplated that the delay attributes of a database trigger may be specified by other suitable techniques, such as a modification of the SQL command CREATE TRIGGER to receive delay attributes in command parameters.

Figure 3:
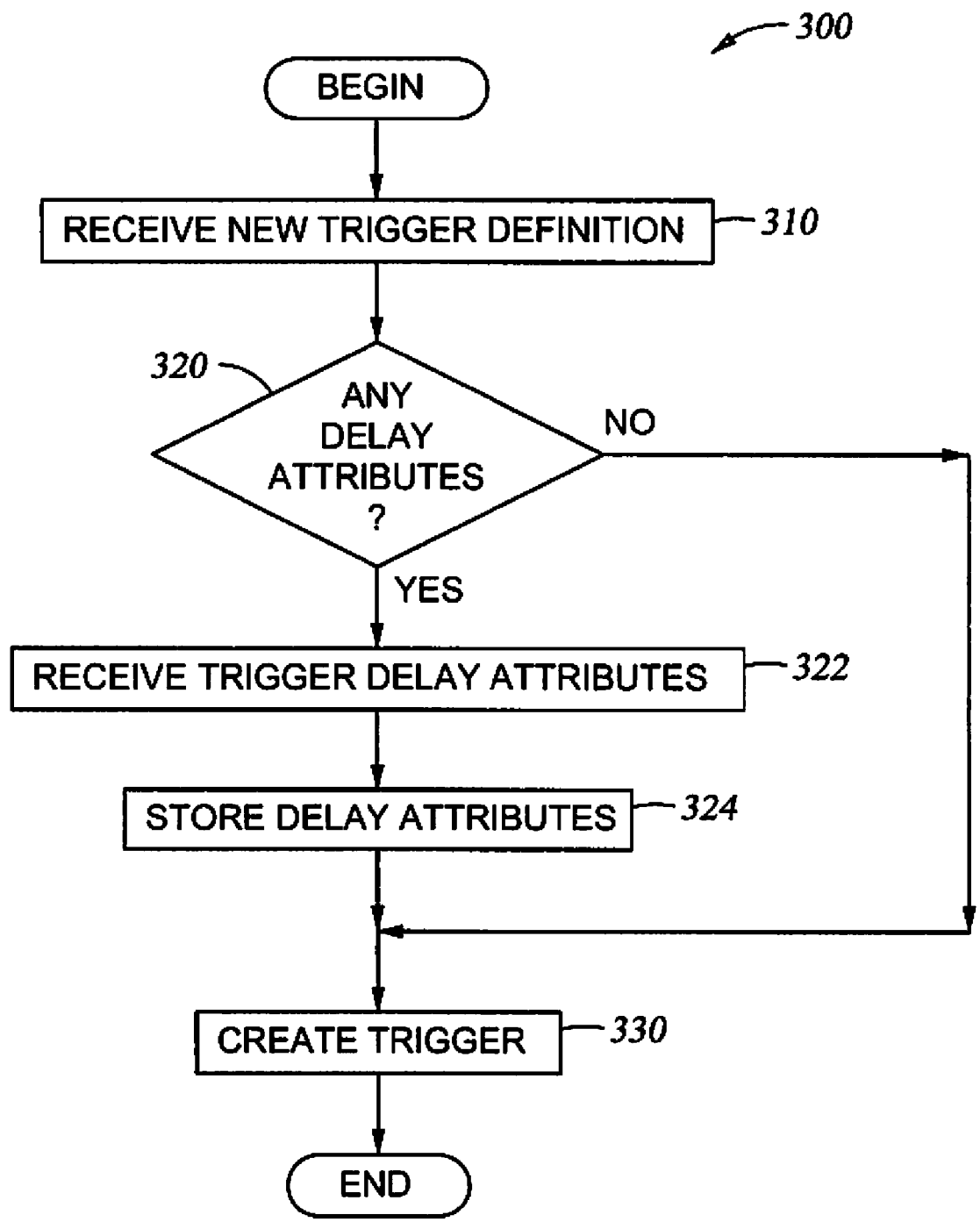
FIG. 3 illustrates a flow diagram illustrating a method for creating database triggers having delay attributes, according to one embodiment of the invention.

FIG. 3 illustrates a flow diagram illustrating a method 300 for creating database triggers having delay attributes, according to one embodiment of the invention. The method 300 begins at step 310, when a new trigger definition is received. This step may result from, for example, a user defining a new trigger. The trigger definition may include a firing condition and a triggered action.

At step 320, it is determined whether the trigger will have delay attributes. That is, whether the trigger will be configured such that, in the event the firing condition takes place, the triggered action will be delayed. This determination may be based on, for example, a user interacting with GUI 200 to specify delay attributes. If it is determined that the trigger will not have delay attributes, the method 300 continues at step 330. Otherwise, the method 300 continues at step 322, where the delay attributes of the trigger are received. The delay attributes may be specified, for example, by a user making selections in the GUI 200. Such selections may include a trigger name, a delay type, and the like. At step 324, the received delay attributes may be stored, for example, in the database 144. At step 330, the defined trigger is created, and the method 300 ends.

Figure 4:
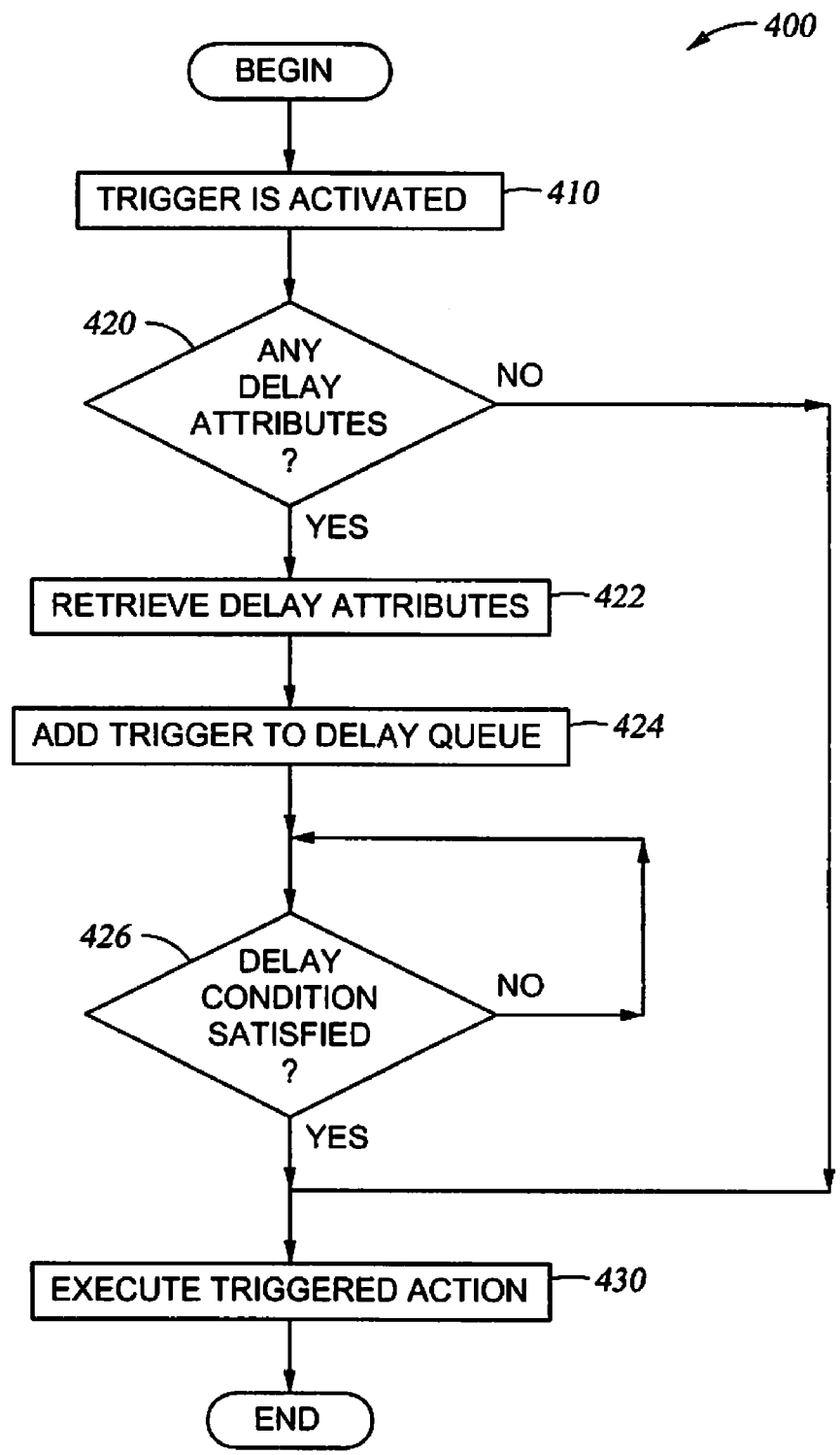
FIG. 4 illustrates a flow diagram 400 illustrating a method for processing database triggers having delay attributes, according to one embodiment of the invention.

FIG. 4 illustrates a flow diagram illustrating a method 400 for processing database triggers having delay attributes, according to one embodiment of the invention. The method 400 begins at step 410, when a trigger is activated. That is, an event specified in the firing condition of a trigger occurs. Such events typically include I/O events of the database, such as INSERT, UPDATE, or DELETE events of a SQL database.

At step 420, it is determined whether the activated trigger has any delay attributes. This step may be performed, by the trigger engine 134 illustrated in FIG. 1. If it is determined that the trigger does not have any delay attributes, the method 400 continues at step 430. Otherwise, the method 400 continues at step 422, where the delay attributes of the trigger are retrieved. The delay attributes may be retrieved from, for example, the database 144.

At step 424, the trigger may be added to a delay queue (e.g., delay queue 136), along with any other triggers having delay attributes that may have been previously activated. At step 426, the delayed trigger may be evaluated to determine whether the delay condition (e.g., time interval selection 230) has been satisfied. If not, the delayed trigger remains in the delay queue. If the delay condition is satisfied, the method 400 continues at step 430, where the triggered action of the trigger is executed. After step 430, the method 400 ends.

While the foregoing is directed to embodiments of the present invention, other and further embodiments of the invention may be devised without departing from the basic scope thereof, and the scope thereof is determined by the claims that follow.

What is claimed is:

1. A computer-implemented method for controlling the firing of database triggers, comprising:
   receiving an I/O event affecting a database trigger, the trigger being defined to fire in response to the I/O event; and
   in response to receiving the I/O event and before firing the database trigger:
      identifying one or more delay conditions defined for the database trigger; and
      delaying the firing of the database trigger until the one or more identified delay conditions are satisfied.

2. The computer-implemented method of claim 1, further comprising:
   firing the database trigger once the one or more identified delay conditions are satisfied; and
   executing a set of instructions programmed for the database trigger.

3. The computer-implemented method of claim 1, wherein satisfying the one or more delay conditions comprises waiting for a predefined period of time.

4. The computer-implemented method of claim 1, wherein satisfying the one or more delay conditions comprises waiting until a predefined time.

5. The computer-implemented method of claim 1, wherein satisfying the one or more delay conditions comprises satisfying a predefined threshold of a system performance measure.

6. The computer-implemented method of claim 5, wherein the system performance measure describes the performance of a database, wherein the database trigger is included in the database.

7. The computer-implemented method of claim 5, wherein the system performance measure describes the performance of a computer in which the database trigger is processed.

8. A computer-readable storage medium containing a program which, when executed, performs an operation, comprising:
   receiving an I/O event affecting a database trigger, the trigger being defined to fire in response to the I/O event; and
   in response to receiving the I/O event and before firing the database trigger:
      identifying one or more delay conditions defined for the database trigger; and
      delaying the firing of the database trigger until the one or more identified delay conditions are satisfied.

9. The computer-readable storage medium of claim 8, wherein the operation further comprises:
   firing the database trigger once the one or more identified delay conditions are satisfied; and
   executing a set of instructions programmed for the database trigger.

10. The computer-readable storage medium of claim 8, wherein satisfying the one or more delay conditions comprises waiting for a predefined period of time.

11. The computer-readable storage medium of claim 8, wherein satisfying the one or more delay conditions comprises waiting until a predefined time.

12. The computer-readable storage medium of claim 8, wherein satisfying the one or more delay conditions comprises satisfying a predefined threshold of a system performance measure.

13. The computer-readable storage medium of claim 12, wherein the system performance measure describes the performance of a database, wherein the database trigger is defined within the database.

14. The computer-readable storage medium of claim 12, wherein the system performance measure describes the performance of a computer in which the database trigger is processed.

15. A system, comprising:
   a processor; and
   a memory containing a program configured to compose a query of hierarchical data by performing an operation, comprising:
      receiving an I/O event affecting a database trigger, the trigger being defined to fire in response to the I/O event; and
      in response to receiving the I/O event and before firing the database trigger:
         identifying one or more delay conditions defined for the database trigger; and
         delaying the firing of the database trigger until the one or more identified delay conditions are satisfied.

16. The system of claim 15, wherein the operation further comprises:
   firing the database trigger once the one or more identified delay conditions are satisfied; and
   executing a set of instructions programmed for the database trigger.

17. The system of claim 15, wherein satisfying the one or more delay conditions comprises waiting for a predefined period of time.

18. The system of claim 15, wherein satisfying the one or more delay conditions comprises waiting until a predefined time.

19. The system of claim 15, wherein satisfying the one or more delay conditions comprises satisfying a predefined threshold of a system performance measure.

20. The system of claim 19, wherein the system performance measure describes the performance of a database, wherein the database trigger is defined within the database.

21. The system of claim 19, wherein the system performance measure describes the performance of a computer in which the database trigger is processed.

* * * * *